United States Patent
Tomaszewski (10) Patent No.: US 8,209,360 B2
(45) Date of Patent: Jun. 26, 2012

(54) SYSTEM FOR DEFINING KEY PERFORMANCE INDICATORS

(75) Inventor: John M. Tomaszewski, Villa Park, IL (US)

(73) Assignee: Computer Associates Think, Inc., Islandia, NY (US)

( * ) Notice: Subject to any disclaimer, the term of this patent is extended or adjusted under 35 U.S.C. 154(b) by 461 days.

(21) Appl. No.: 12/137,243

(22) Filed: Jun. 11, 2008

(65) Prior Publication Data

US 2009/0313279 A1    Dec. 17, 2009

(51) Int. Cl.
*G06F 17/30* (2006.01)

(52) U.S. Cl. .......... 707/803; 707/797; 707/798

(58) Field of Classification Search ............ None
See application file for complete search history.

(56) References Cited

U.S. PATENT DOCUMENTS

| Patent No. | Date | Inventor | Cite |
|---|---|---|---|
| 7,313,533 B2 | 12/2007 | Chang et al. | |
| 7,657,777 B2 * | 2/2010 | Wong et al. | 714/2 |
| 7,848,947 B1 * | 12/2010 | McGloin et al. | 705/7.42 |
| 2002/0116213 A1 * | 8/2002 | Kavounis et al. | 705/1 |
| 2005/0216831 A1 | 9/2005 | Guzik et al. | |
| 2005/0289138 A1 | 12/2005 | Cheng et al. | |
| 2006/0010164 A1 | 1/2006 | Netz et al. | |
| 2007/0118419 A1 * | 5/2007 | Maga et al. | 705/10 |
| 2007/0156680 A1 | 7/2007 | Tien et al. | |
| 2007/0179823 A1 | 8/2007 | Bhaskaran et al. | |
| 2008/0059441 A1 * | 3/2008 | Gaug et al. | 707/4 |
| 2008/0059630 A1 * | 3/2008 | Sattler et al. | 709/224 |
| 2008/0091815 A1 * | 4/2008 | Rao | 709/223 |

* cited by examiner

*Primary Examiner* — Debbie Le
(74) *Attorney, Agent, or Firm* — Schwegman, Lundberg & Woessner, P.A.

(57) ABSTRACT

A system and method include a database having multiple tables with columns containing information. A database application executes queries against the database. An externalized data structure are stored on the system and provide a user modifiable set of key performance indicators facilitating selection of database tables and queries against the tables to provide multiple levels of viewable key performance indicators to users without having to recompile the database application upon modification of the set of key performance indicators.

20 Claims, 11 Drawing Sheets

KPI Definitions Element/Attribute Descriptions

NAME – KPI name that uniquely identifies the KPI and associated level 2 and level 3 attributes.

DISPLAY_NAME – Localized name for UI & messages, etc. (e.g. "MyKPIName" or "_LXXX1234")

COUNT_QUERY – SQL query that defines the count/value displayed on top level view (Level 0) KPI count.

TAXONOMY_MAP – Taxonomy map name, contains the category, table and corresponding taxonomy to table column mappings. The table/view defines the columns used by level 2/3 views. See Taxonomy Map definitions file for taxonomy map definitions, Category definitions file for category definitions and the Table definition file for table definitions.

DETAIL_VIEW_MAP – Detail view map name, contains the detail view columns to display and corresponding table column mappings. See Detail View map file.

VIEW_WHERE_XXXX - (optional) – Level 2 and 3 view KPI WHERE clause condition for filtered and un-filtered queries. No WHERE clause means no filtering is required, meaning "SELECT * FROM my_table" returns the correct set of records.

Below are the three types of VIEW_WHERE clause tags that may be specified:

VIEW_WHERE_CLAUSE – Database independent WHERE clause that works for any database type (syntax not DB specific).

VIEW_WHERE_CLAUSE_MSSQL – MS SQL specific clause (database specific - date/time functions, etc.)

VIEW_WHERE_CLAUSE_INGRES – Ingres specific clause (database specific - date/time functions, etc.)

TOP_LEVEL_TAB - (optional) – Top level "home" tab that should be active when displaying the level 2 or 3 views. Identifies the logical "home" tab on the user interface for the KPI and defines the top level breadcrumb. The default is the level 0 "Hot Spots" tab if no tab is specified.

*FIG. 4*

Example KPI Definition for Unsupported Computers

```
<kpidef name="Hardware_Unsupported_Computers"
    display_name="Gen KPI GKPI3 - Unsupported Computers"
    taxonomy_map="GenKPI_Hardware_TaxMap"
    detail_view_map="GenKPI_Hardware_DetailViewMap"
    top_level_tab="Hot Spots"
    >
    <count_query>SELECT COUNT(*) AS counter FROM all computers
                WHERE (osname LIKE 'Windows 2000%') OR
                (osname LIKE 'Windows Me') OR (osname LIKE
                'Windows 9%') OR (osname LIKE 'Windows
                NT%')
    </count_query>
                <view_where_clause>( !!AI_TABLE_NAME.osname LIKE
                'Windows 2000%') OR ( !!AI_TABLE_NAME.osname
                LIKE 'Windows Me') OR (
                !!AI_TABLE_NAME.osname LIKE 'Windows 9%')
                OR ( !!AI_TABLE_NAME.osname LIKE 'Windows
                NT%')
    </view_where_clause>
</kpidef>
```

*FIG. 5*

Taxonomy Map Element/Attribute Descriptions

TAXONOMY_MAP NAME – Name that uniquely identifies the taxonomy map. This name is also used in the KPI definition to identify the taxonomy map associated with the KPI. See Definitions.

TAXONOMY_MAP CATEGORY – Category name that uniquely identifies the logical group of related KPIs and corresponding taxonomies. See Categories.

TAXONOMY_MAP TABLE – Table name that uniquely identifies the table definition and corresponding column definitions. See Tables.

MAP TAXONOMY – Name that uniquely identifies the taxonomy in a category definition. See Categories.

MAP COLUMN – Name that uniquely identifies the column in a table definition. See Tables.

*FIG. 6*

Example Taxonomy Map for Unsupported Computers KPI

```
<taxonomy_map name="AIKPI_Hardware_TaxMap" category="AIKPI_Hardware"
table="all_computers" >
    <mappings>
        <map taxonomy="os"           column="osname" />
        <map taxonomy="os_sp"        column="ossp" />
        <map taxonomy="source"       column="hwsource" />
        <map taxonomy="domain"       column="hwdom" />
        <map taxonomy="vendor"       column="hwmfgr" />
        <map taxonomy="model"        column="hwmodel" />
        <map taxonomy="performance"  column="hwcpuperf" />
        <map taxonomy="organization" column="orgnm" />
        <map taxonomy="location"     column="region" />
        <map taxonomy="department"   column="office" />
    </mappings>
</taxonomy_map>
```

*FIG. 7*

Categories Element/Attribute Descriptions

CATEGORY NAME - Category name that uniquely identifies the logical group of related KPIs and corresponding taxonomies.

CATEGORY DISPLAY_NAME - "short" localized name for UI & messages, etc. (e.g. "Cat1" or "_LXXX1234") It should be an abbreviated short name, 5 or less characters, (e.g. HW, SW, Stg, LDoc ).

CATEGORY DISPLAY_NAME_LONG - "longer" full localized name for UI & messages, etc. (e.g. "My Category Name" or "_LXXX1234")

TAXONOMY NAME - Name that uniquely identifies the taxonomy in the category.

TAXONOMY DISPLAY_NAME - Localized name for UI & messages, etc. (e.g. "Tax1" or "_LXXX1234") Name should correspond to the type of data displayed for a specific taxonomy (e.g. Vendor, Status, Location )

*FIG. 8*

Example Hardware Category Definition

AIKPI_Hardware - GKPI3 - GenKPI Hardware

```
<category name="AIKPI_Hardware" display_name="AIKPI3"
display_name_long="AIKPI Hardware">
    <taxonomies>
        <taxonomy name="os"            display_name="OS" />
        <taxonomy name="os_sp"         display_name="OS SP" />
        <taxonomy name="source"        display_name="Source" />
        <taxonomy name="domain"        display_name="Domain" />
        <taxonomy name="vendor"        display_name="Vendor" />
        <taxonomy name="model"         display_name="Model" />
        <taxonomy name="performance"   display_name="Performance" />
        <taxonomy name="organization"  display_name="Organization" />
        <taxonomy name="location"      display_name="Location" />
        <taxonomy name="department"    display_name="Department" />
    </taxonomies>
</category>
```

*FIG. 9*

Example Table Definition

```xml
<table name="all_computers" type="base" initialize="y" populate="y" reconcile="y" merge="y">
    <columns>
        <!-- ai_oldef_prop table columns -->
            <column name="userid"        type="nvarchar" width="32"   nullable="y" />
            <column name="orgnm"         type="nvarchar" width="255"  nullable="y" />
            <column name="office"        type="nvarchar" width="255"  nullable="n" />
            <column name="hwsource"      type="nvarchar" width="128"  nullable="y" />
            <column name="region"        type="nvarchar" width="255"  nullable="y" />
            <column name="osname"        type="nvarchar" width="128"  nullable="y" />
            <column name="ossp"          type="nvarchar" width="128"  nullable="y" />
            <column name="osver"         type="nvarchar" width="128"  nullable="y" />
            <column name="ospub"         type="nvarchar" width="128"  nullable="y" />
            <column name="oslanguage"    type="nvarchar" width="128"  nullable="y" />
            <column name="hwuse"         type="nvarchar" width="16"   nullable="y" />
            <column name="fssize"        type="float"                 nullable="y" />
            <column name="fsfree"        type="float"                 nullable="y" />
            <column name="instdate"      type="datetime"              nullable="n" />
            <column name="lscandate"     type="datetime"              nullable="y" />
        <!-- ai_hwdef_prop table columns -->
            <column name="hwuuid"        type="binary"                nullable="n" />
            <column name="hwdom"         type="nvarchar" width="128"  nullable="n" />
            <column name="hwname"        type="nvarchar" width="128"  nullable="n" />
            <column name="hwsn"          type="nvarchar" width="128"  nullable="n" />
            <column name="hwtype"        type="nvarchar" width="128"  nullable="n" />
            <column name="hwmfgr"        type="nvarchar" width="128"  nullable="n" />
            <column name="hwmodel"       type="nvarchar" width="128"  nullable="n" />
            <column name="hwmem"         type="int"                   nullable="n" />
            <column name="hwbiosmfgr"    type="nvarchar" width="128"  nullable="n" />
            <column name="hwbiosver"     type="nvarchar" width="128"  nullable="n" />
            <column name="hwbiosdate"    type="nvarchar" width="128"  nullable="n" />
            <column name="hwprocmfgr"    type="nvarchar" width="128"  nullable="n" />
            <column name="hwprocmodel"   type="nvarchar" width="128"  nullable="n" />
            <column name="hwproctype"    type="nvarchar" width="128"  nullable="n" />
            <column name="hwproccount"   type="int"                   nullable="n" />
            <column name="hwprocspeed"   type="int"                   nullable="n" />
            <column name="hwcpuperf"     type="float"                 nullable="n" />
    </columns>
</table>
```

FIG. 10

Detail View Map Element/Attribute Descriptions

DETAIL_VIEW_MAP NAME – Name that uniquely identifies the detail view map. This name is also used in the KPI definition to identify the detail view map associated with the KPI. See Definitions.

MAP NAME – Name that uniquely identifies the detail view map entry. For taxonomy columns, this name also identifies the taxonomy in a category definition. See Categories.

MAP COLUMN – Name that uniquely identifies the column in a table definition. See Tables.

MAP DISPLAY_NAME – (Required for displayed columns) Localized name displayed in the detail level view for UI & messages, etc. (e.g. "Cat1" or "_LXXX1234")

MAP DISPLAY_WIDTH – (optional) Relative width of column for display in the detail view. Total of all columns should be 100%. (e.g. "7%")

MAP DISPLAY_TOOLTIP – (optional) Tooltip to use for the data value column, the default tooltip uses the display name.

*FIG. 11*

Example Hardware Detail View Map Definition

```xml
<detail_view_map name="AIKPI_Hardware_DetailViewMap" >
    <mappings>
        <!-- Visible columns follow -->
        <map name="machine_name"    column="hwname"     display_name="Machine Name" display_width="4%" />
        <map name="owner"           column="userid"     display_name="Owner" display_width="4%" />
        <!-- Taxonomy column -->
        <map name="os"              column="osname"     display_name="OS" display_width="18%" display_tooltip="Operating System" />
        <!-- Taxonomy column -->
        <map name="os_sp"           column="ossp"       display_name="OS SP" display_width="18%" display_tooltip="Operating System Service Pack" />
        <!-- Taxonomy column -->
        <map name="source"          column="hwsource"   display_name="Source" display_width="8%" />
        <!-- Taxonomy column -->
        <map name="domain"          column="hwdom"      display_name="Domain" display_width="8%" />
        <!-- Taxonomy column -->
        <map name="vendor"          column="hwmfgr"     display_name="Vendor" display_width="8%" />
        <!-- Taxonomy column -->
        <map name="model"           column="hwmodel"    display_name="Model" display_width="4%" />
        <!-- Taxonomy column -->
        <map name="performance"     column="hwcpuperf"  display_name="Performance" display_width="4%" />
        <!-- Taxonomy column -->
        <map name="organization"    column="orgnm"      display_name="Organization" display_width="8%" />
        <!-- Taxonomy column -->
        <map name="location"        column="region"     display_name="Location" display_width="8%" />
        <!-- Taxonomy column -->
        <map name="department"      column="office"     display_name="Department" display_width="8%" />
    </mappings>
</detail_view_map>
```

SYSTEM FOR DEFINING KEY PERFORMANCE INDICATORS

BACKGROUND

Key performance indicator (KPI) metric analysis data is made available for many systems. In one system, a dashboard type of web interface is provided to users to view KPI data, such as for example the number of computers in an organization. Several such pieces of information may be made available via the interface, and programming to produce such information is hard coded into an underlying KPI program. The logic for KPI calculations and user display of the calculated data is tied directly together, making KPI data difficult to update and modify without significant software code changes. Additionally, KPI data often requires modifications in the field to reflect an organization's unique characteristics, which may be difficult to accomplish using existing systems.

SUMMARY

A system and method include a database having multiple tables with columns containing information. A database application executes queries against the database. An externalized data structure are stored on the system and provide a user modifiable set of key performance indicators facilitating selection of database tables and queries against the tables to provide multiple levels of viewable key performance indicators to users without having to recompile the database application upon modification of the set of key performance indicators.

In one embodiment, a method provides a first level external interface that facilitates user interaction to define high level count based key performance indicator data. A second level external interface facilitates user interaction to define filters applicable to the high level count data. A third level external interface facilitates user interaction to select detail from the filtered high level key performance indicator data, wherein the user interaction does not result in recompilation of a key performance indicator data application. In further embodiments, a machine readable medium has instructions for execution by a machine to perform the method.

BRIEF DESCRIPTION OF THE DRAWINGS

FIG. 4 shows a commented portion of a KPI definitions XML file that contains element/attribute descriptions according to an example embodiment.

FIG. 10 illustrates a tables map for computer hardware based on an all computers database view, which may be based on a combination of tables according to an example embodiment.

FIG. 12 is a hardware detail view map that shows details that may be seen at a third level view according to an example embodiment.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. The term "computer readable media" is also used to represent any means by which the computer readable instructions may be received by the computer, such as by different forms of wired or wireless transmissions. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method for defining key performance indicators (KPI) uses a generic system having external definitions, which may be written in XML. Various embodiments externalize KPI metric criteria and characteristics that describe each KPI definition at various levels that include top level aggregate summary counts, filter taxonomy views and detail views. The XML definitions provide all of the attributes required to define the KPI high level focus area, metric criteria, filter taxonomies and source data for the basis of the calculations.

Figure 1:
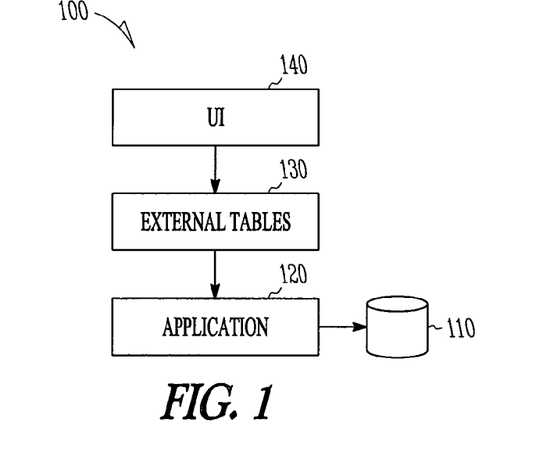
FIG. 1 is a block diagram illustrating a key performance indicators system according to an example embodiment.

FIG. 1 is a block diagram illustrating a key performance indicator system 100 according to an example embodiment. A database 110, such as a relational database contains information from which key performance indicators may be generated. There are many different examples of data that may be kept. One example may be data describing computers owned or used by multiple locations and organizations within a business. Much information can be stored in multiple different tables. It should be noted that this is just one minor example of information from which key performance indicators may be generated, and massive amounts of data on the computers and other information may be kept in multiple tables with multiple columns in database 110. Tables are meant to include indexes and views of data, or other constructs used to represent data in database 100 in further embodiments.

An application, such as a database application 120 is used to access the data in database 110 and provide key performance indicator data for display to a user. The application may provide queries to database 110, or may be integrated into a database server in further embodiments. Application 120 may also interface with external tables 130, which in one embodiment provide the XML definitions of key performance indicators, including queries, attribute information and all other information which may be used to specify data in database 110 against which the queries may be run to generate and display the key performance indicators. In one embodiment, the external tables 130 are XML files that are easily modifiable by a user to modify, add, delete and otherwise change key performance indicators and their display to the user without having to recompile the application 120 when such changes are made.

A user interface 140 is also illustrated in block form. User interface may be used to display the key performance indicators that are generated by the application 120 using the external tables 130 in one embodiment. In further embodiments, the user interface 140 may provide an interface directly into the XML external tables 130 to facilitate modification of and generation of new key performance indicators via a form based interface or other type of interface for ease of use. In still further embodiments, users may directly modify the XML external tables 130 using one of many commercially available editors.

Figure 2:
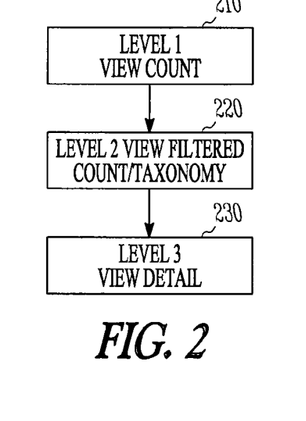
FIG. 2 is a block diagram illustrating multiple levels of display of key performance indicators according to an example embodiment.

FIG. 2 is a block diagram illustrating multiple levels of display of key performance indicators according to an example embodiment. A first level view 210 corresponds to a high level view, such as simple count. In the example of computers in an organization, the count may simply be a total count that represents the number of computers in the organization. A second level view 220 provides a filtered view of the level one view. The filter allows a user to apply various taxonomies, such as providing a display of the number of computers within each location of the organization, or based on the type of computer, operating system being used, or whether the computer is configured with supported software. The filter taxonomies provide a much better ability to manage the computers by viewing information about the computers in a desired manner. This view may need to change frequently, as perhaps new locations are added or deleted, different types of computers are purchased, different operating systems are obtained, etc. At 230, a level three view is provided. The level three view 230 provides raw data from the database tables, such as a row from a table that may be joined with other tables. For instance, the level three view may provide raw data providing the actual model of a computer, serial number, operating system installed, etc., on an individual record basis. There is a need to be able to easily change the KPI at all three levels due to the rapidly changing computer environment.

Figure 3:
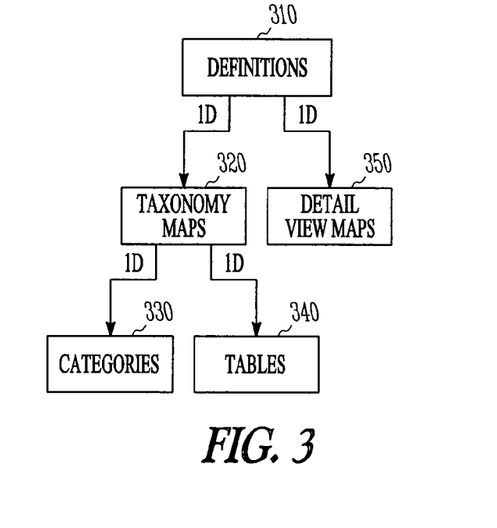
FIG. 3 is a block diagram illustrating data structures for modification of key performance indicators according to an example embodiment.

FIG. 3 is a block diagram illustrating data structures (310, 320, 330, 340, 350) corresponding to external tables 130 in FIG. 1, for modification of key performance indicators according to an example embodiment. In one embodiment, a definitions table 310 (shown in more detail in FIGS. 4 and 5) provides KPI definitions that specify attributes for display of KPI metrics for the level one or top level, as well as corresponding level two and level three views. Threshold alerts and custom graphics, such as bar graphs and line graphs may be specified. Defining a KPI involves specifying a KPI definition in this table and a corresponding taxonomy map 320 (shown in further detail in FIGS. 6 and 7), category/taxonomy definition map 330 (shown in further detail in FIGS. 8 and 9), table definition map 340 (shown in further detail in FIG. 10), and a detail view map 350 (shown in further detail in FIGS. 11 and 12).

Taxonomy map 320 (shown in further detail in FIGS. 6 and 7) identifies the category and corresponding table definitions to be used by a particular KPI. A particular map identifies the category and table, as well as a correlation or mapping between category taxonomies and table column definitions. These maps may be used by various parts of the level two and level three query generation and user interface display routines. Separating the table definition from the taxonomy list allows the use of different tables or views using a common category taxonomy list. A many-to-one relationship may exist between different taxonomy maps using different underlying tables, but belong to and use the same category. They may be in the same logical group of KPIs and use the same taxonomy list.

Category/taxonomy definition map 330 (shown in further detail in FIGS. 8 and 9) provides definitions that specify the logical groups of related KPIs, such as hardware and software, etc. The available taxonomies for each category may also be defined that will be available to the user on the level 2 view that they can use to further filter the data. The category definition in one embodiment is associated with the KPI definition through the taxonomy map 320 that specifies the correlation between logical taxonomy attributes and the underlying table columns used to query and display KPI metric data.

Table definition map 340 (shown in further detail in FIG. 10) provides definitions that identify the table and corresponding table definitions to be used by a particular KPI via the taxonomy map 320. The format of elements and attributes in this map 340 are used by application 120 to dynamically generate the SQL query to retrieve the data from the database 110 that is displayed on the level 1, 2 and 3 views.

Detail view map 350 (shown in further detail in FIGS. 11 and 12) contains definitions that identify the detail view attributes which may be shown in a level three view 230, and also identifies corresponding table columns to be displayed for a particular KPI. A particular map identifies the correlation/mapping between detail view attributes and table definitions. The detail view map indirectly relies on the taxonomy map 320 defined for the KPI to get the table column information. In one embodiment, the detail view map and column names that are taxonomies match the taxonomy names in the KPI taxonomy map 320 to ensure proper level three query generation and to handle null and undefined values in counts.

FIG. 4 shows a commented portion of a KPI definitions XML file that contains element/attribute descriptions. Descriptions are provided for a number of elements and attributes, including NAME, DISPLAY NAME, COUNT_QUERY, TAXONOMY_MAP, DETAIL_VIEW_MAP, various VIEW_WHERE clauses and TOP_LEVEL_TAB.

Figure 5:
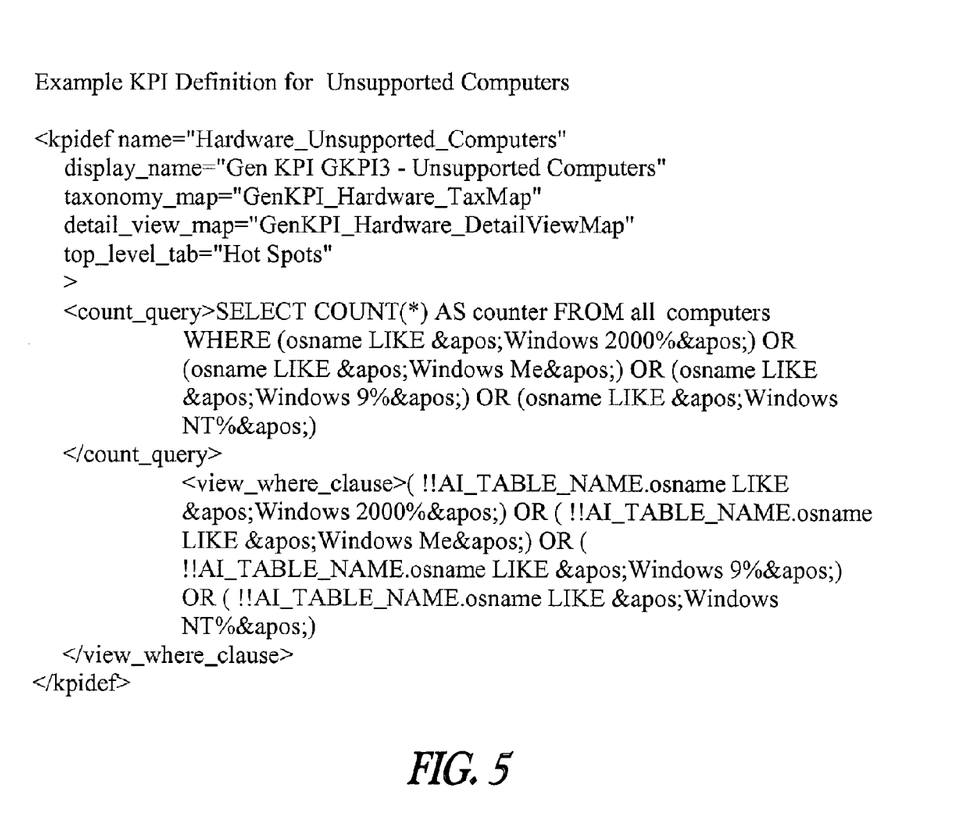
FIG. 5 shows a commented portion of a KPI definitions XML file that contains KPI definitions for an "unsupported computers" KPI according to an example embodiment.

FIG. 5 shows a commented portion of a KPI definitions XML file that contains KPI definitions for an example "unsupported computers" KPI. The attributes shown in FIG. 4, are defined for the unsupported computers KPI, and a count_query is defined for providing a number of unsupported computers. There may be several such portions of the KPI definitions XML file that contain definitions for several other KPIs.

Figure 6:
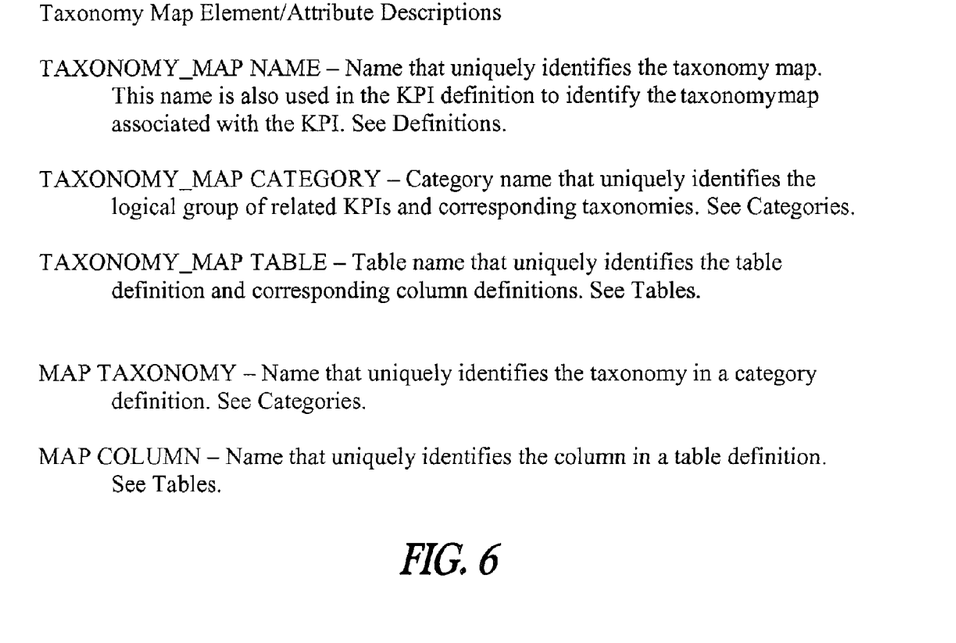
FIG. 6 shows a commented portion of a taxonomy map. XML file that contains descriptions for taxonomy map element/attribute descriptions according to an example embodiment.

FIG. 6 shows a commented portion of a taxonomy map XML file that contains descriptions for taxonomy map element/attribute descriptions. TAXONOMY_MAP NAME, TAXONOMY_MAP CATEGORY, TAXONOMY_MAP TABLE, MAP TAXONOMY AND MAP COLUMN definitions are provided.

Figure 7:
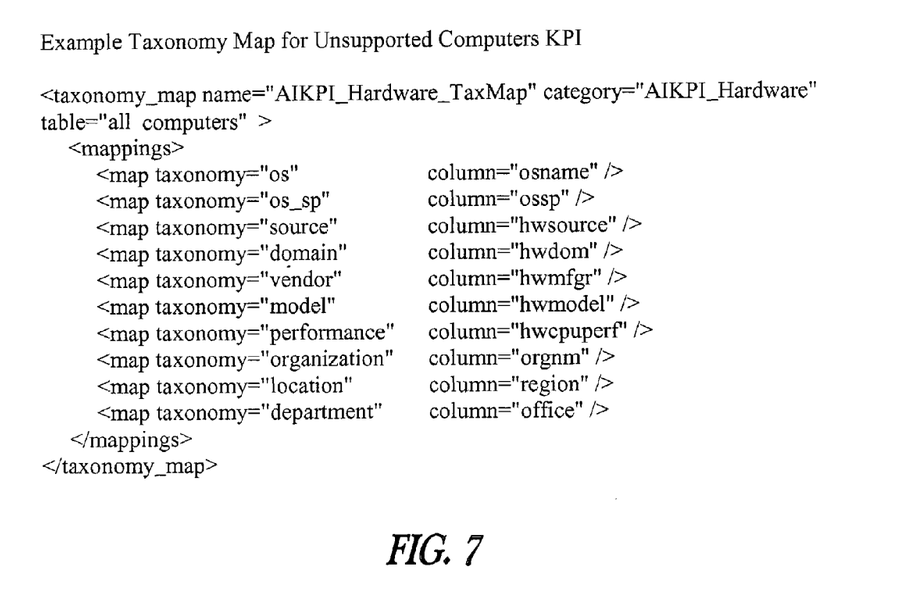
FIG. 7 illustrates a portion of the taxonomy map XML file corresponding to the unsupported computers KPI according to an example embodiment.

FIG. 7 illustrates a portion of the taxonomy map XML file corresponding to the unsupported computers KPI. It identifies the category, table and maps the taxonomy filters to the table columns in one embodiment.

Figure 8:
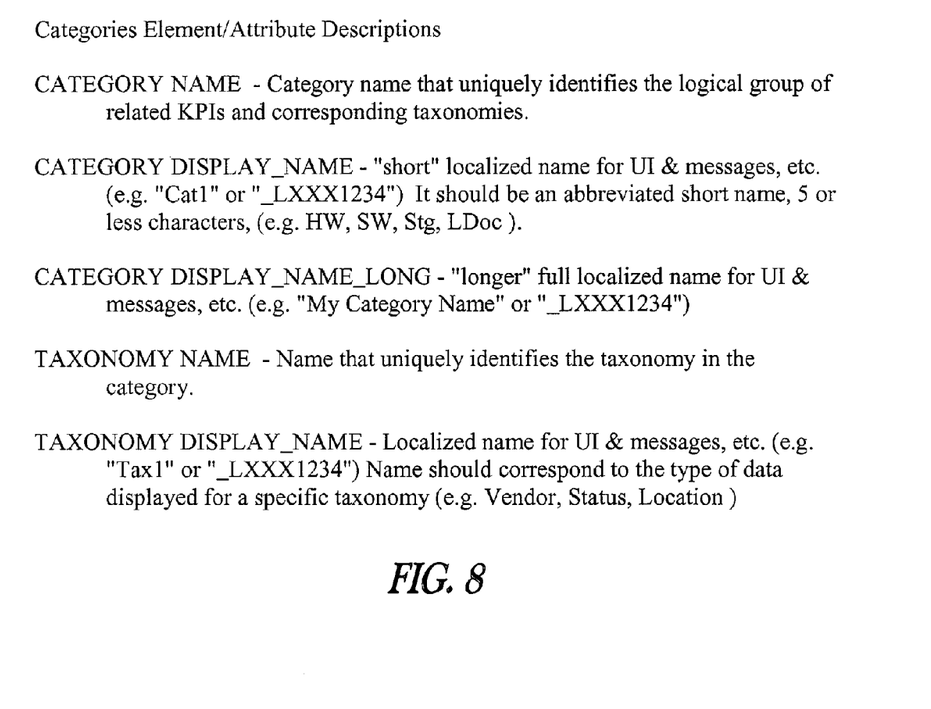
FIG. 8 shows a commented portion of categories element attribute descriptions XML file according to an example embodiment.

FIG. 8 shows a commented portion of categories element attribute descriptions XML file. Descriptions are provided for the CATEGORY NAME, CATEGORY DISPLAY_NAME, CATEGORY DISPLAY_NAME_LONG, TAXONOMY NAME and TAXONOMY DISPLAY_NAME. The file associates a name with an external display name that the user sees. The file makes it more understandable to a user.

Figure 9:
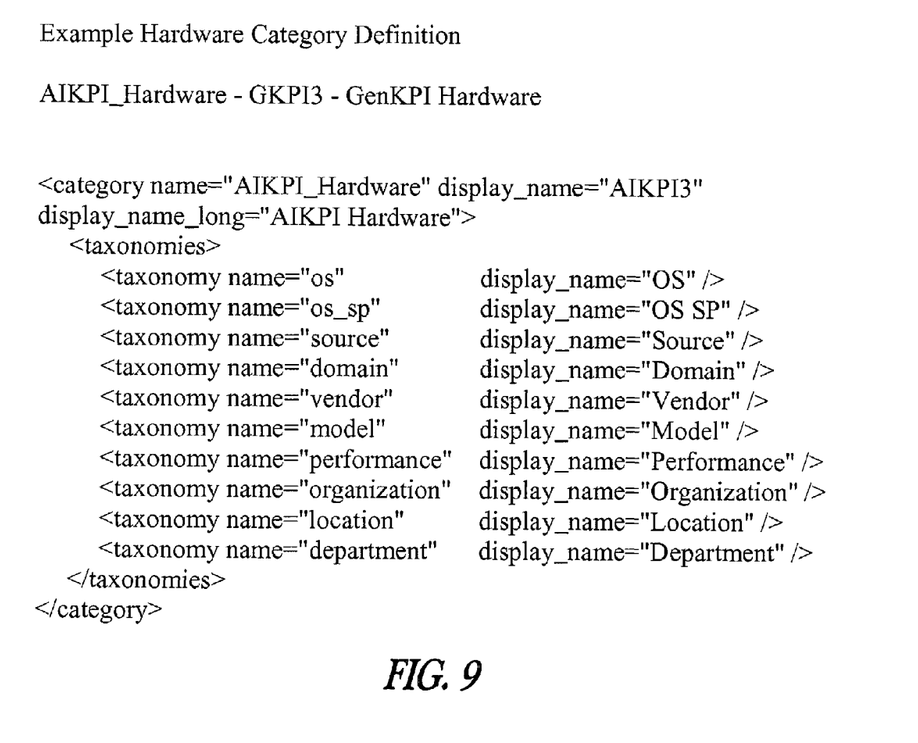
FIG. 9 illustrates a portion of the categories XML file corresponding to the unsupported computers KPI according to an example embodiment.

FIG. 9 illustrates a portion of the categories XML file corresponding to the unsupported computers KPI.

FIG. 10 illustrates a tables map for computer hardware based on an all computers database view, which may be based on a combination of tables. Common database attributes such as column name, data type, width, nullable, etc, may be included.

Figure 11:
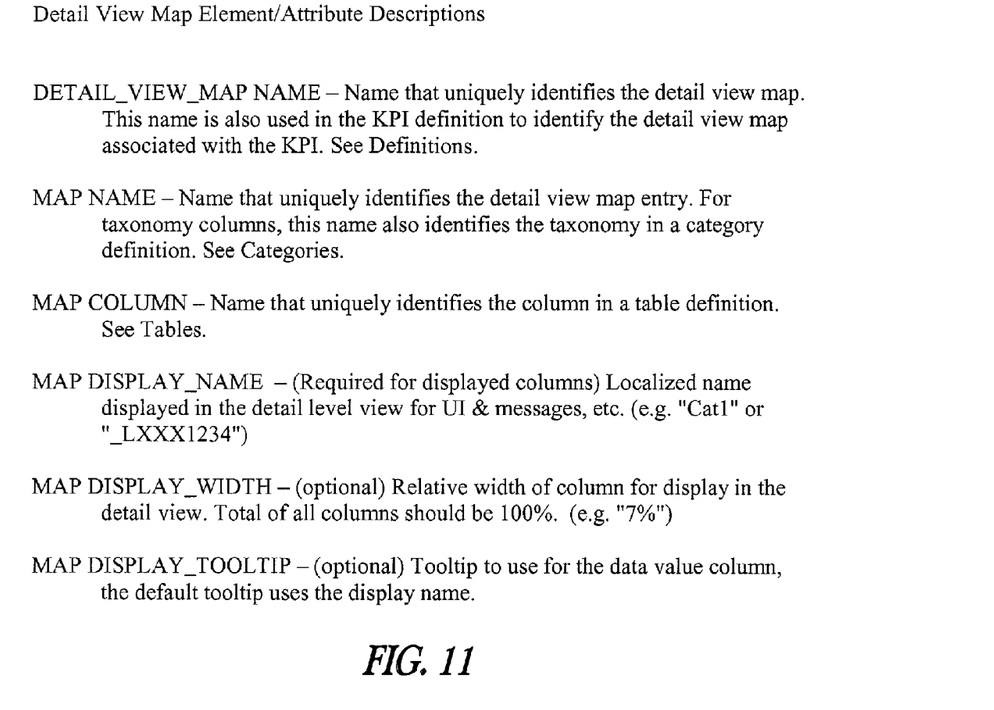
FIG. 11 illustrates a detail element/attribute descriptions XML file that identifies view attributes and corresponding table columns to be displayed according to an embodiment.

FIG. 11 illustrates a detail view map element/attribute descriptions XML file that identifies view attributes and corresponding table columns to be displayed. Attributes describe include DETAIL_VIEW_MAP NAME, MAP NAME, MAP COLUMN, MAP DISPLAY_NAME, MAP DISPLAY_WIDTH, and MAP DISPLAY_TOOLTIP in one embodiment.

FIG. 12 illustrates a hardware detail view map that shows details that may be seen at a third level view. The detail view map may map back to taxonomy columns. In this file, a user can add and remove columns for views and the table is updated to indirectly reference actual columns in corresponding tables.

Various benefits may be provided by different embodiments. Some embodiments may allow new KPI focus areas to be added with little or no architectural changes. Allow new KPI definitions to be displayed in other systems that can read and/or support the XML definition specification. Allow KPIs to be distributable to customers without any code or logic changes. Allow KPIs to updated and modified without having to make programmatic code changes. Allow KPI metrics calculation to be based on data from user defined sources. KPI selection criteria, taxonomies, categories and detail views can be modified without any code changes.

Figure 13:
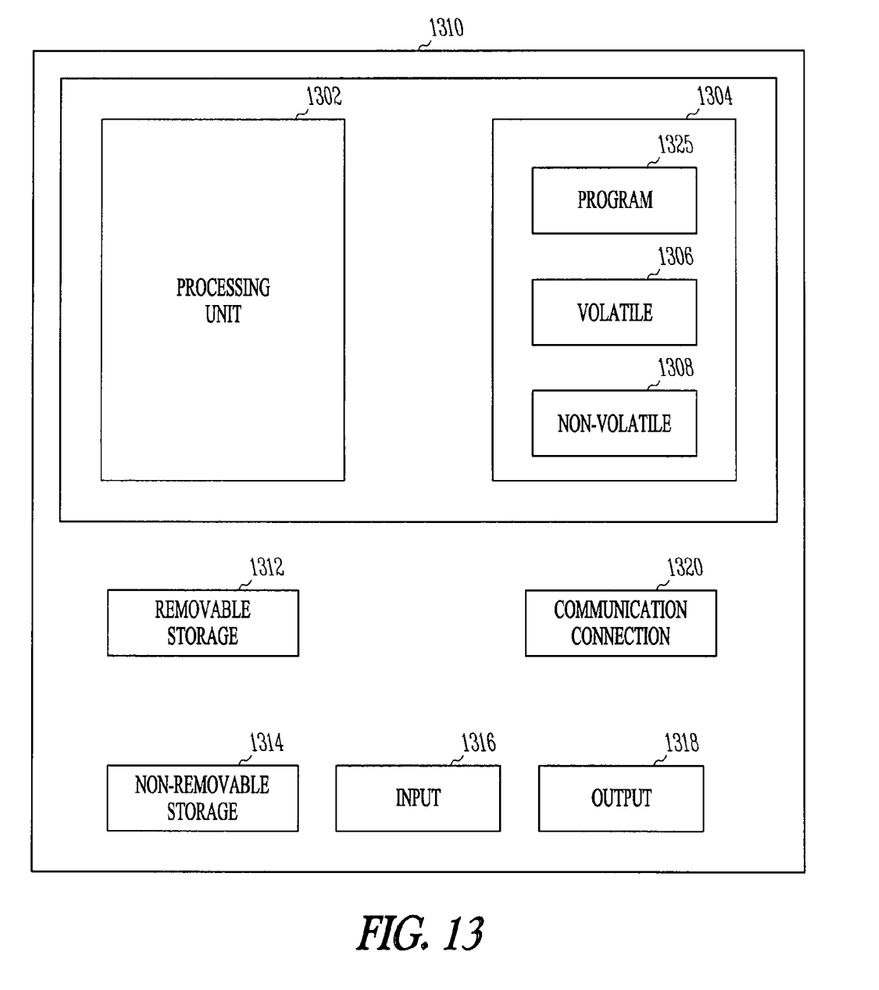
FIG. 13 is a block diagram of a typical computer system on which key performance indicator methods may be implemented according to an example embodiment.

A block diagram of a computer system that executes programming for performing the above algorithm is shown in FIG. 13. A general computing device in the form of a computer 1310, may include a processing unit 1302, memory 1304, removable storage 1312, and non-removable storage 1314. Memory 1304 may include volatile memory 1306 and non-volatile memory 1308. Computer 1310 may include—or have access to a computing environment that includes—a variety of computer-readable media, such as volatile memory 1306 and non-volatile memory 1308, removable storage 1312 and non-removable storage 1314. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 1310 may include or have access to a computing environment that includes input 1316, output 1318, and a communication connection 1320. The computer may operate in a networked environment using a communication connection to connect to one or more remote computers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 1302 of the computer 1310. A hard drive, CD-ROM, and RAM are some examples of articles including a computer-readable medium.

The Abstract is provided to comply with 37C.F.R. §1.72(b) to allow the reader to quickly ascertain the nature and gist of the technical disclosure. The Abstract is submitted with the understanding that it will not be used to interpret or limit the scope or meaning of the claims.

The invention claimed is:

1. A system comprising:
a processing unit; and
a memory storage unit, storing:
  a database having multiple tables with columns containing information regarding hardware and software in an organization;
  a database application for executing queries against the database; and
  an externalized data structure stored on the system that provides a user modifiable set of key performance indicators covering the hardware and software in an organization, facilitating selection of database tables and queries against the tables to provide multiple levels of viewable key performance indicators to users without having to recompile the database application upon modification of the set of key performance indicators.

2. The system of claim 1 wherein the externalized data structure comprises a definitions table for specifying attributes for display of KPI metrics for each of the multiple levels of viewable key performance indicators.

3. The system of claim 2 wherein the definitions table further specifies threshold alerts and custom bar or line graphs.

4. The system of claim 2 wherein the definitions table comprises a name that uniquely identifies a key performance indicator and associated level attributes.

5. The system of claim 2 wherein the definitions table comprises a query that defines a key performance indicator count for each key performance indicator.

6. The system of claim 2 wherein the externalized data structure further comprises for each key performance indicator, a definition in the definitions table, a corresponding taxonomy map, a category definition and a detail view map.

7. The system of claim 6 wherein the taxonomy map identifies a category and table definitions and a correlation between category taxonomies and table column definitions for each key performance indicator.

8. The system of claim 7 wherein the category definition specifies logical groupings of related key performance indicators and available taxonomies for each grouping.

9. The system of claim 7 wherein the externalized data structure further comprises a raw database table definition for each key performance indicator for use via the taxonomy map.

10. The system of claim 7 wherein the detail view map provides for each key performance indicator, detail view attributes and corresponding table columns to be displayed for a detailed view of data corresponding to key performance indicators.

11. The system of claim 1 wherein the externalized data structure comprises multiple XML files.

12. A method comprising:
   providing a first level external interface that facilitates user interaction to define high level count based key performance indicator data;
   providing a second level external interface that facilitates user interaction to define taxonomy filters applicable to the high level count data; and
   providing a third level external interface that facilitates user interaction to select detail from the filtered high level key performance indicator data, wherein the user interaction does not result in recompilation of a key performance indicator data application.

13. The method of claim 12 wherein the external interfaces comprise XML files.

14. The method of claim 13 wherein the XML files define queries for execution by the key performance indicator data application.

15. The method of claim 13 wherein the XML files define relational tables from which to extract key performance indicator data.

16. The method of claim 13 wherein the XML files comprise a definitions table, a taxonomy maps table, a categories table and a detail view maps table.

17. The method of claim 16 and further comprising an XML file that provides a raw database table definition for each key performance indicator for use via the taxonomy map.

18. A machine readable medium having instructions for execution by a machine to perform a method comprising:
   providing a first level external interface that facilitates user interaction to define high level count based key performance indicator data;
   providing a second level external interface that facilitates user interaction to define filters applicable to the high level count data; and
   providing a third level external interface that facilitates user interaction to select detail from the filtered high level key performance indicator data, wherein the user interaction does not result in recompilation of a key performance indicator data application.

19. The machine readable medium of claim 18 wherein the external interfaces comprise XML files.

20. The machine readable medium of claim 19 wherein the XML files define queries for execution by the key performance indicator data application.

\* \* \* \* \*